United States Patent [19]
Howell et al.

[11] Patent Number: 5,999,401
[45] Date of Patent: Dec. 7, 1999

[54] SHROUDLESS SMALL FORM CD ROM FOR NOTEBOOK COMPUTERS

[75] Inventors: Bryan Howell, Austin; Edward P. Sheehan, Jr., Cedar Park, both of Tex.; Peter N. Skillman, San Carlos, Calif.

[73] Assignee: Dell U.S.A., L.P., Round Rock, Tex.

[21] Appl. No.: 08/782,152

[22] Filed: Sep. 19, 1997

[51] Int. Cl.⁶ ........................................ G06F 1/16
[52] U.S. Cl. .................. 361/684; 361/724; 361/685; 369/75.2; 369/77.2
[58] Field of Search ................. 361/724, 684, 361/727, 685, 683; 364/708.1; 369/75.2, 77.2; 360/97.01

[56] References Cited

U.S. PATENT DOCUMENTS

| | | | |
|---|---|---|---|
| D. 372,228 | 7/1996 | Sawada et al. ........................ | D14/109 |
| 4,941,841 | 7/1990 | Darden et al. ........................ | 361/685 |
| 5,299,185 | 3/1994 | Sakurai et al. ...................... | 369/75.2 |
| 5,689,489 | 11/1997 | Shin ................................... | 369/75.2 |
| 5,801,922 | 9/1998 | Shen et al. .......................... | 361/684 |
| 5,883,870 | 3/1999 | Akiba et al. ........................ | 369/77.1 |
| 5,905,632 | 5/1999 | Seto et al. .......................... | 361/683 |

*Primary Examiner*—Donald Sparks
*Assistant Examiner*—John D. Reed
*Attorney, Agent, or Firm*—Haynes and Boone, L.L.P.

[57] ABSTRACT

A computer system includes a housing having a slot of a defined footprint area. A pair of inserts are provided. One of the inserts is a shroudless CD drive insert selectively insertable in the slot for operably driving a CD ROM disc. The other of the inserts is a standard floppy drive insert selectively insertable in the slot for operably driving a floppy disc. Each insert has substantially the same footprint area as the slot and as each other. The footprint area is sized to receive the standard floppy drive insert. The CD ROM drive insert is shroudless and is insertable in the slot for driving a larger size storage media than the floppy insert.

17 Claims, 6 Drawing Sheets

SHROUDLESS SMALL FORM CD ROM FOR NOTEBOOK COMPUTERS

BACKGROUND

The disclosures herein relate generally to CD ROM drives and more particularly to placing a shroudless CD ROM drive in the footprint and volume of a standard floppy disc drive.

Figure 1:
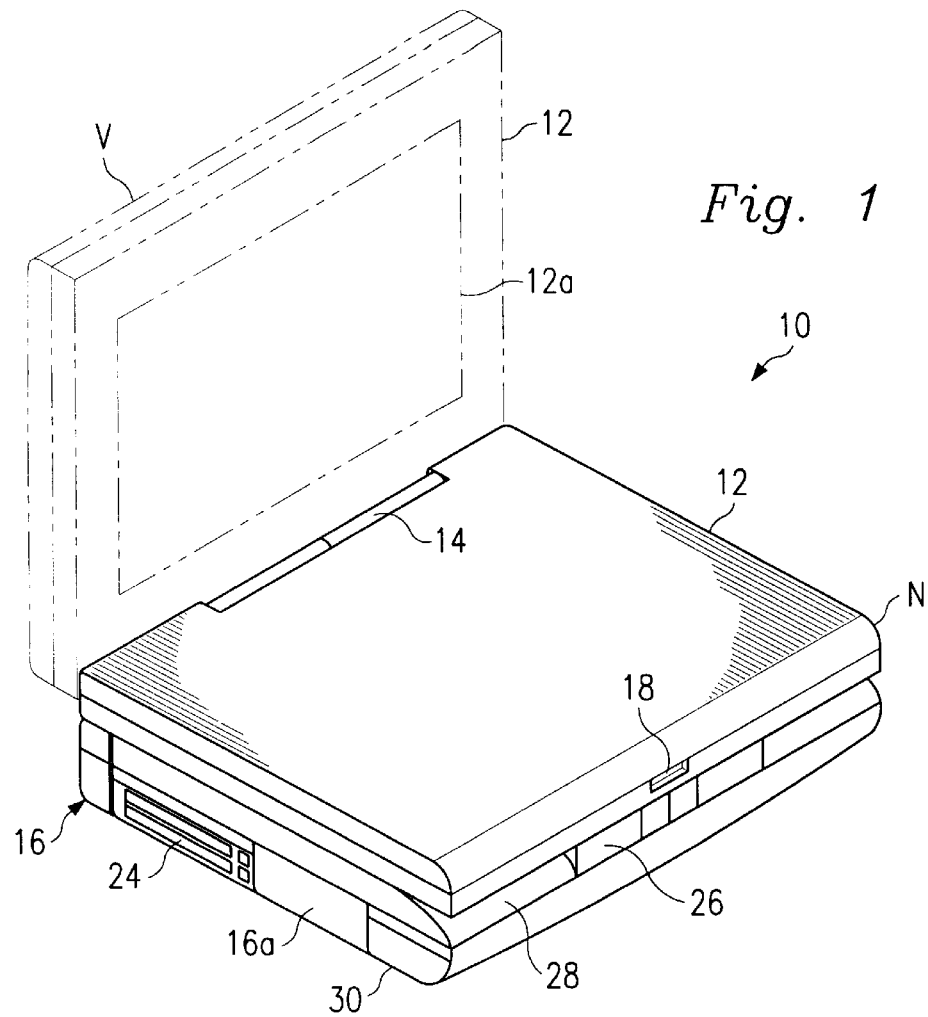
Figure 1A:
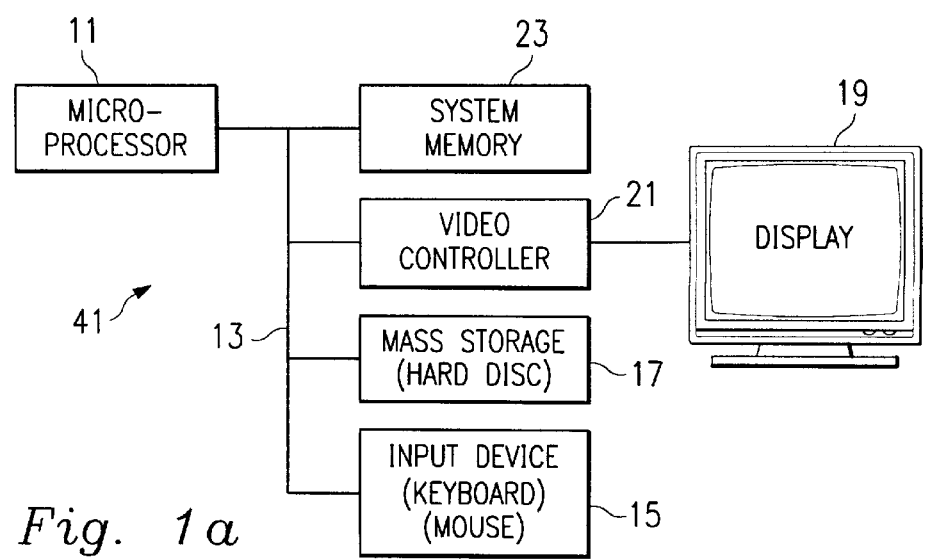
Figure 2:
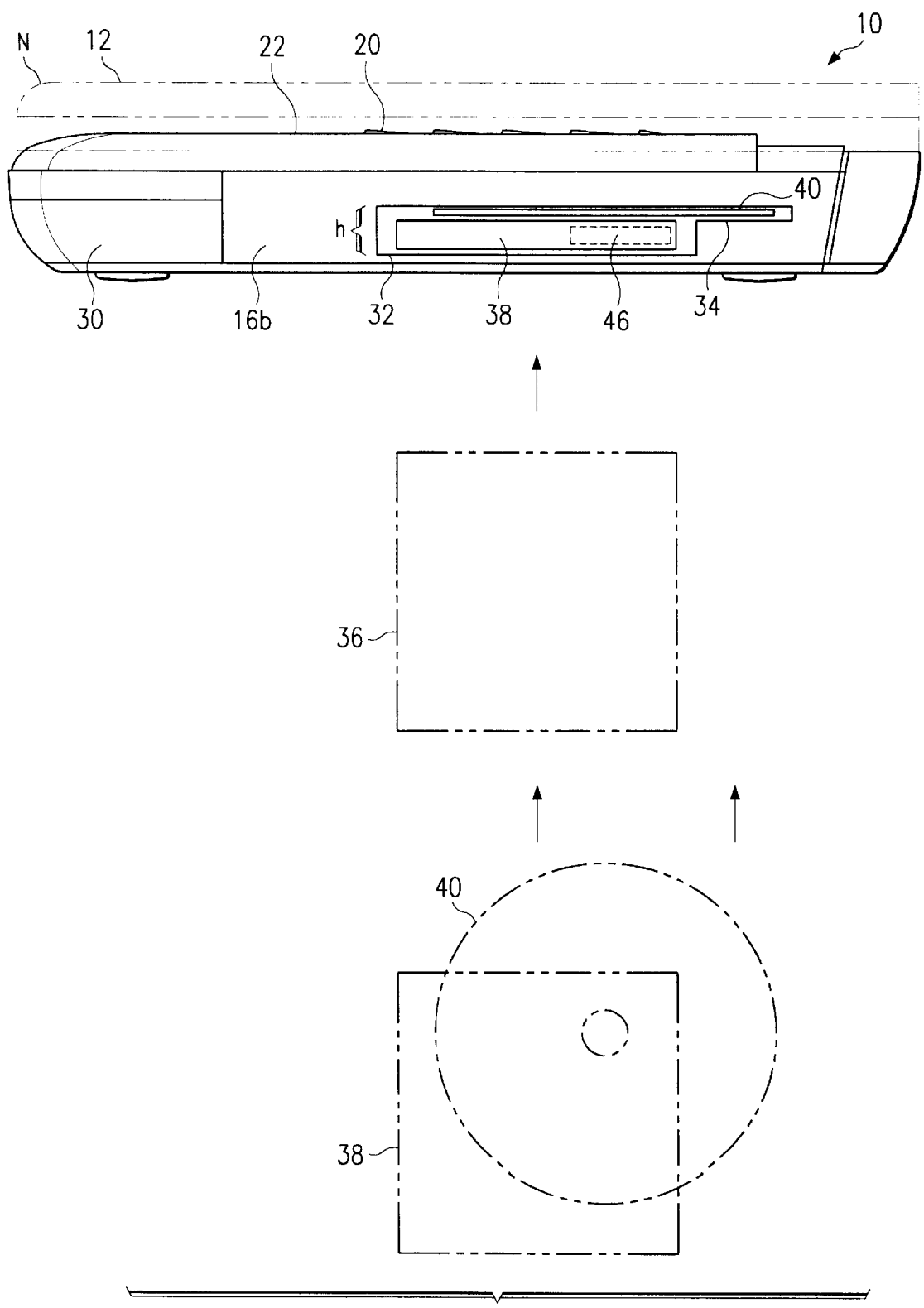
Figure 3:
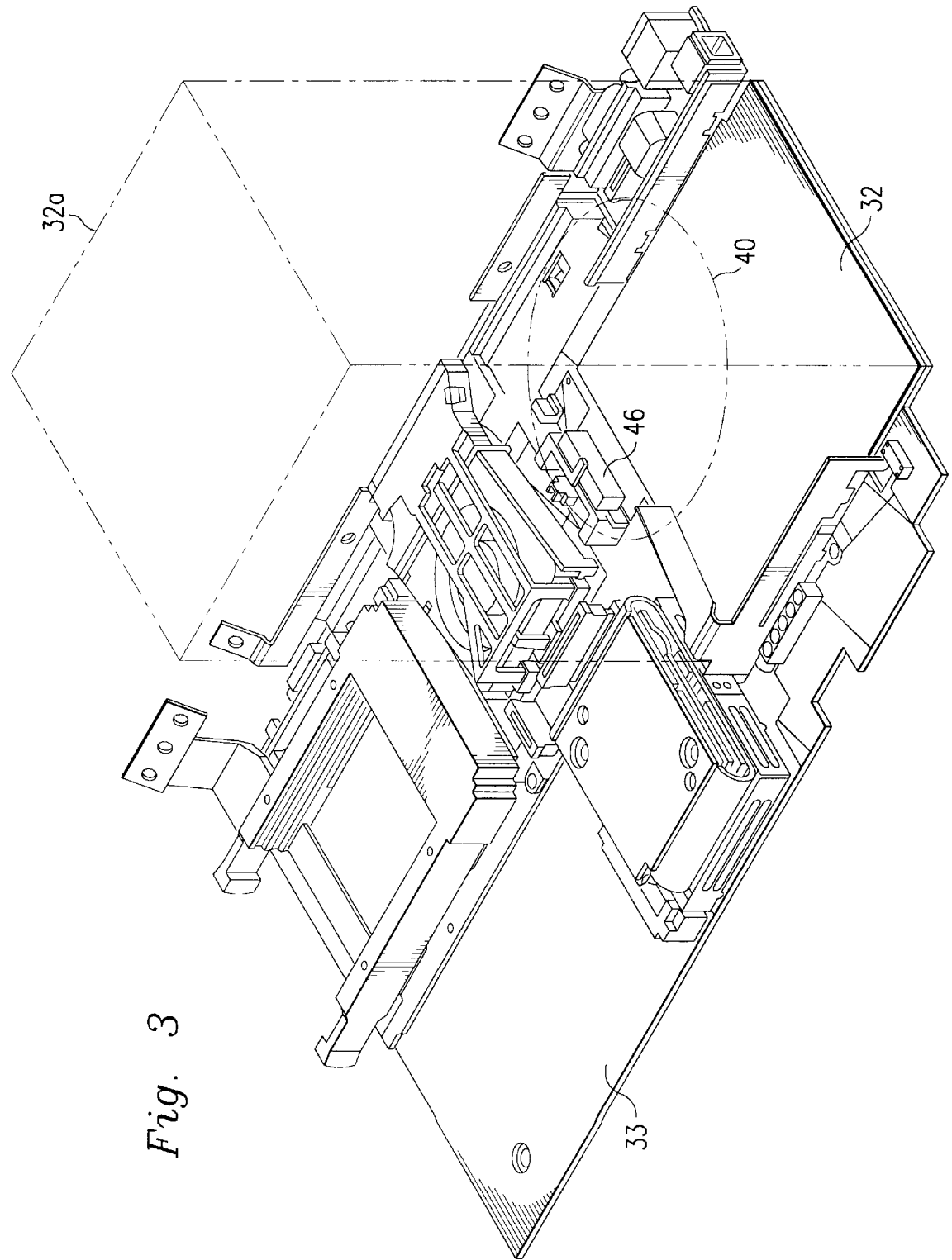
Figure 4:
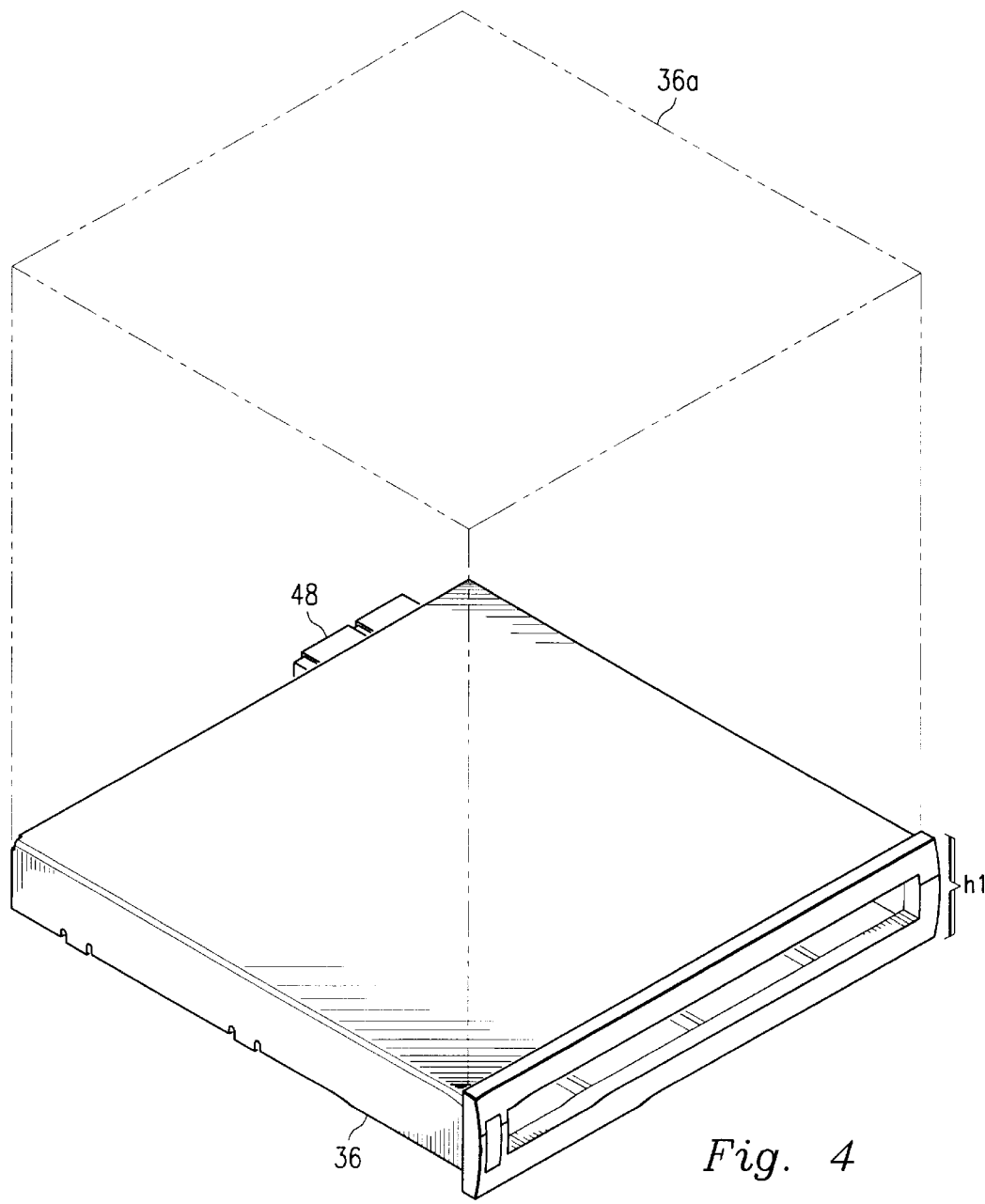
Figure 5:
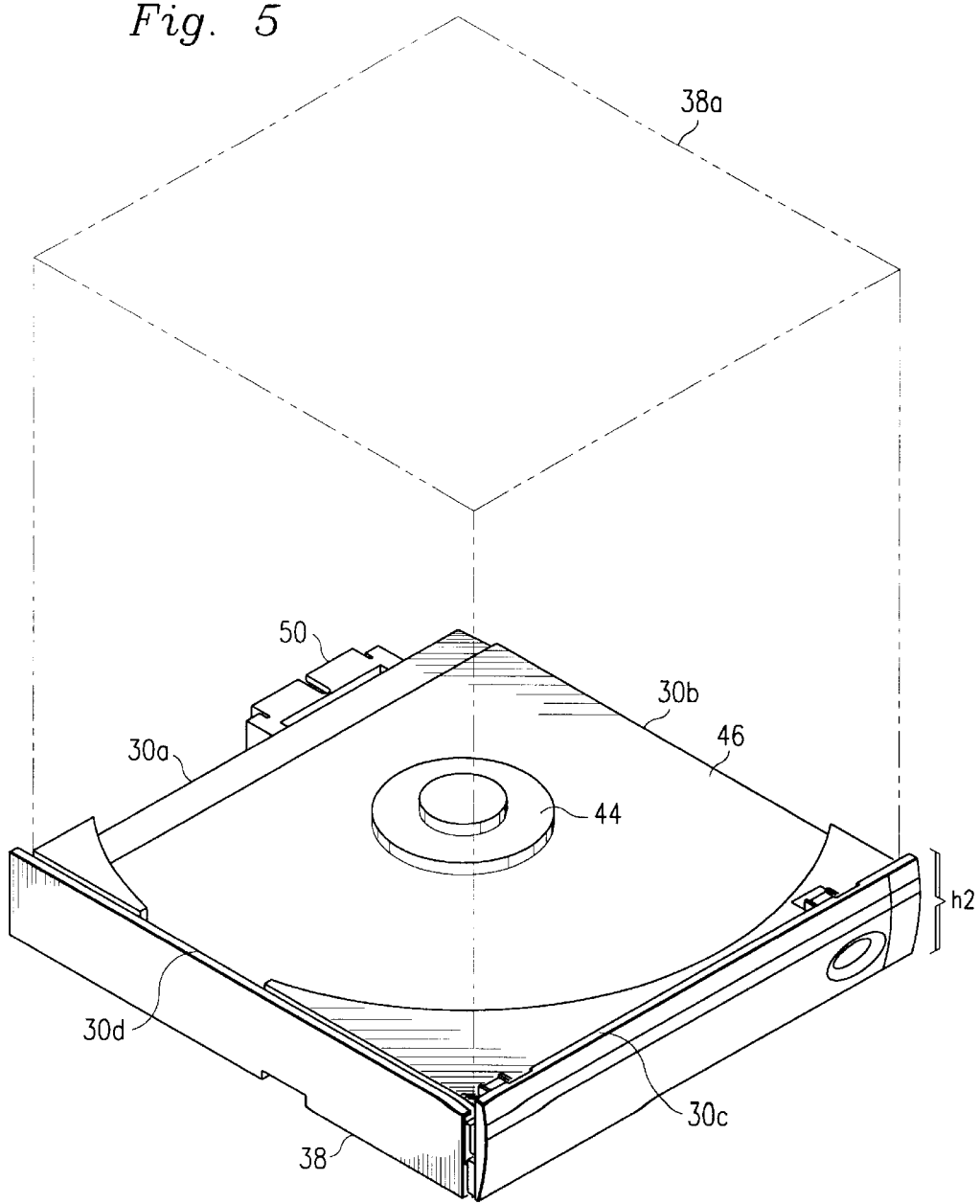
Figure 6:
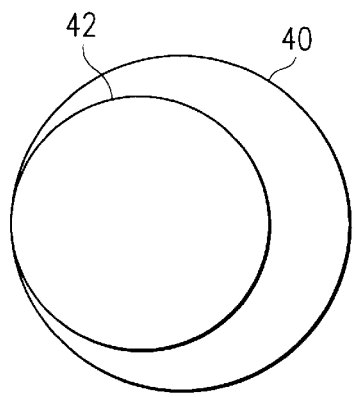
Figure 7:
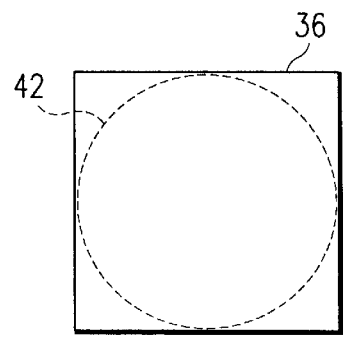
Figure 8:
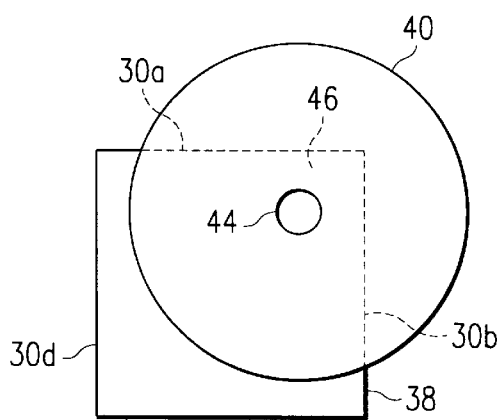

In multimedia notebook computers it is necessary to have a CD ROM. The CDs are very large and their drive modules have enlarged the standard notebook computer so as to accommodate them. The market requires the smallest notebook possible. Thus, there is an obvious conflict. Typically, these notebook CD ROM drive modules are removable from a large media bay and replaceable with a module that has a floppy drive in it. The floppy drive module is smaller than the CD ROM drive module because of the difference in size of their respective discs. The smaller floppy modules are fitted into the large media bay by housing the floppy drive in a dummy carrier of the same size as the CD module. Again, this makes the notebook computer larger than necessary.

Typical CD ROM drive modules have a sheet metal shroud that covers the entire CD drive and disc. The shroud is thick and the module also includes extension arms on the side of the drive which when operated, extend the disc out of the module to be replaced. Because of this extension, there is a large service loop in a cable that requires a dead space behind the unit. This requirement enlarges the CD module and packages a lot of air in the CD module.

Therefore, what is needed is an apparatus and a method for placing a full size CD ROM drive module in the footprint of a relatively smaller standard floppy disc drive module rather than vice versa as has been described. It is also highly desirable to provide for the CD ROM drive module and floppy drive module to be of substantially the same volume.

SUMMARY

One embodiment, accordingly, provides an apparatus and method of using a CD ROM drive module in the footprint and volume of a standard floppy drive module. To this end, a computer system includes a housing having a slot provided therein. The slot has a defined footprint area. A pair of inserts are provided, each having substantially the same footprint area as the slot and as each other. One of the inserts is a floppy insert for driving a floppy disc. The inserts are alternately removably inserted in the slot and each insert is respectively provided for driving a different size storage media than the other insert.

A principal advantage is that the larger CD ROM disc and the smaller floppy disc are each driven by the same size drive module which fits into the slot. This requires less dead air space in the housing and contributes to maintaining the desired small size of notebook computers. This is in contrast to present devices which place a floppy disc drive module in a dummy carrier provided to fit in a large media bay sized to receive a standard CD ROM drive module.

BRIEF DESCRIPTION OF THE DRAWINGS

FIG. 1 is an isometric view illustrating an embodiment of a portable computer.

FIG. 1*a* is a diagrammatic view illustrating an embodiment of a computer system.

FIG. 2 is a side view of the computer of FIG. 1.

FIG. 3 is an isometric view illustrating an embodiment of a portable computer chassis.

FIG. 4 is an isometric view illustrating an embodiment of a floppy drive module.

FIG. 5 is an isometric view illustrating an embodiment of a CD ROM drive module.

FIG. 6 is a plan view diagrammatically illustrating an embodiment of a floppy disc and a CD ROM disc.

FIG. 7 is a plan view diagrammatically illustrating an embodiment of a floppy drive module including a disc.

FIG. 8 is a plan view diagrammatically illustrating an embodiment of a CD ROM drive module including a disc.

FIG. 9 is a plan view diagrammatically illustrating an embodiment of a prior art CD ROM drive module.

DESCRIPTION OF THE PREFERRED EMBODIMENT

Referring to FIGS. 1 and 2, illustrated is a portable, notebook size computer designated 10 including a self-contained computer system 41, FIG. 1*a,* and including a hinged top or lid 12 rotatable about a pivotable member 14 from a nested position "N", with a horizontal housing base 16, to a substantially vertical or open position "V" shown in FIG. 1.

In one embodiment, computer system 41, FIG. 1*a,* includes a microprocessor 11 which is connected to a bus 13. Bus 13 serves as a connection between microprocessor 11 and other components of computer system 41. An input device 15 is coupled to microprocessor 11 to provide input to microprocessor 11. Examples of input devices include keyboards, touchscreens, and pointing devices such as mouses, trackballs and trackpads. Programs and data are stored on a mass storage device 17 which is coupled to microprocessor 11. Mass storage devices include such devices as hard disks, optical disks, magneto-optical drives, floppy drives and the like. Computer system 41 further includes a display 19 which is coupled to microprocessor 11 by a video controller 21. A system memory 23 is coupled to microprocessor 11 to provide the microprocessor with fast storage to facilitate execution of computer programs by microprocessor 11. It should be understood that other busses and intermediate circuits can be deployed between the components described above and microprocessor 11 to facilitate interconnection between the components and the microprocessor.

Opening of the notebook style portable computer by manipulation of a latch 18, reveals a plurality of keys 20, FIG. 2, on an exposed horizontal keyboard surface 22 of base 16, and a monitor screen 12*a* in an exposed portion of lid 12, FIG. 1. Computer 10 also includes a sidewall 16*a* having plurality of external ports, an exemplary one of which is designated 24. Base 16 may also include a pointing device 26, FIG. 1, such as a track pad, track ball or the like. A palm rest 28 is commonly provided adjacent keyboard 22, FIG. 2, which forms an upper surface of a battery housing 30. Housing 16 includes an access slot 32 formed in a sidewall 16*b* opposite sidewall 16*a* of housing 16. Slot 32 is generally rectangular and is integrally formed with a slit 34.

Slot 32 has a rectangular footprint area 32*a* in a chassis 33, FIG. 3, of a size sufficient to receive both a rectangular floppy disc drive module 36, having a footprint area 36*a,* FIG. 4, and a rectangular shroudless CD ROM disc drive module 38, having a footprint area 38*a,* FIG. 5. CD ROM disc drive module 38 has four peripheral sides 30*a,* 30*b,* 30*c* and 30*d.* It is well known that the relative size of a CD ROM disc 40, FIG. 6, is substantially larger than the size of a floppy disc 42, also illustrated in FIG. 6. The footprint area 32a of the slot 32, FIG. 3, is substantially the same as the footprint area 36a of floppy module 36, FIG. 4, and the same as the footprint area 38a of CD module 38, FIG. 5. Also, slot 32 has a volume as measured by the height h times the footprint area 32a, FIGS. 2 and 3, which is sufficient to receive either the floppy module 36 or the CD module 38, alternately and selectively. This is because the height h of slot 32 is substantially the same as the height h 1 of floppy module 36 and the height h 2 of CD module 38, FIGS. 4 and 5. Although the modules 36, 38 have substantially equal footprint areas 36a, 38a, respectively, as slot footprint area 32a, FIGS. 3, 4 and 5, their ability to drive substantially different size discs such as CD disc 40 and floppy disc 42 is possible. This is accomplished because floppy disc 42 fits within floppy module 36, FIG. 7, as is well known. However, CD disc 40 is positioned above and overhangs two, 30a, 30b, of the four peripheral sides 30a, 30b, 30c and 30d of rectangular CD module 38 due to the offset of a CD drive spindle 44 being positioned substantially adjacent a corner portion 46 where sides 30a and 30b converge, FIG. 8. This is in contrast to a prior art CD ROM module 138, FIG. 9, which is substantially larger than the CD ROM module 38 so that there is no overhang.

The overhang arrangement is accommodated in the housing 16 by providing the slit 34, FIG. 2, which communicates with slot 32. Slit 34 permits ingress and egress of CD disc 40 into and out of housing 16 simultaneously with ingress and egress of CD module 38 into and out of slot 32. Within housing 16, there is no wasted space because CD disc 40 flies above components within the housing 16, FIGS. 2 and 3. A connector 46, FIG. 3, in housing 16 adjacent slot 32, mates with either of a connector 48 of floppy module 36, FIG. 4, or a connector 50 of CD module 38, FIG. 5.

In operation, FIG. 2, when a floppy disc 42 is to be utilized with computer 10, floppy module 36 is placed in slot 32 so that floppy connector 48 operably engages housing connector 46. A floppy disc 42 can then be operably inserted in and removed from floppy module 36. When a CD disc 40 is to be utilized with computer 10, floppy module 36 is removed from slot 32. A CD disc 40 can then be operably installed on CD module spindle 44, and when CD module 38 is moved into slot 32, CD disc 40 simultaneously enters housing 16 partially via slot 32 and the overhang enters via slit 34. CD connector 50 becomes engaged with housing connector 46. If subsequent use of computer 10 requires a floppy disc 42, egress is accomplished in the same manner, i.e. simultaneous movement of CD module 38 from slot 32 and CD disc 40 partially via slot 32 as the overhang moves through slit 34. Thus, CD module 38 is removed and replaced by floppy module 36 as described above.

Figure 9:
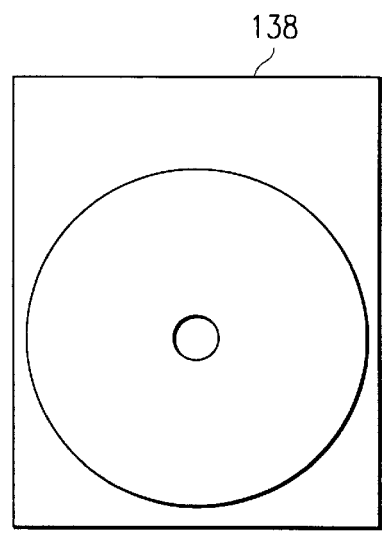

As it can be seen, the principal advantage of the above-described embodiment is maintaining the desired small size of a portable notebook computer. The prior art CD module, FIG. 9, is encased in a shroud 138 not only to carry the CD drive mechanism but also house the large CD disc. As a result, the smaller floppy module is placed in an oversized carrier which was of the size of the shrouded CD module so that both the floppy module and CD module could utilize the same slot. Both drive modules utilize the same slot but the slot is now the size of the smaller floppy module. The CD module is shroudless and has the same footprint area of the floppy module and the slot. The larger CD disc does not require the enlarged slot but only an adjacent slit to permit CD disc ingress and egress from the housing, thus the floppy module size slot also receives the CD module.

Although an illustrative embodiment has been shown and described, a wide range of modifications, change and substitution is contemplated in the foregoing disclosure and in some instances, some features of this embodiment may be employed without a corresponding use of other features. Accordingly, it is appropriate that the appended claims be construed broadly and in a manner consistent with the scope of the embodiment disclosed herein.

What is claimed is:

1. A computer system comprising:
    a housing having a sidewall including a slot provided therein and a slit integrally formed with and extending from the slot; and
    a pair of inserts, each insert having a footprint, a first one of the inserts being a floppy insert for driving a floppy disc, and a second one of the inserts being a shroudless CD insert for driving a CD, the slot providing an opening for inserting the first insert and floppy disc into the housing, the slot providing the opening for inserting the second insert into the housing, and the integrally formed slit permitting the second insert to carry the CD into the housing.

2. The system as defined in claim 1, wherein the footprint is rectangular and the slot, the second insert and the first insert have substantially the same height.

3. The system as defined in claim 1, wherein the slot, the second insert and the first insert having substantially the same volume.

4. The system as defined in claim 1, wherein the second insert includes a plurality of peripheral sides.

5. The system as defined in claim 4, wherein a portion of the CD overhangs at least two of the peripheral sides and the overhanging portion of the CD is movable through the slit when the second insert is mounted in and removed from the slot.

6. The system as defined in claim 1, wherein the housing includes a connector in the slot.

7. The system as defined in claim 6, wherein each of the second insert and first insert has a connector provided for mating engagement with the connector in the slot.

8. A computer system comprising:
    a microprocessor;
    an input coupled to provide input to the microprocessor;
    a mass storage coupled to the microprocessor;
    a display coupled to the microprocessor by a video controller;
    a memory coupled to provide storage to facilitate execution of computer programs by the microprocessor;
    a housing having a sidewall including a slot integrally formed with an adjacent slit, the slot having a volume;
    a pair of inserts, a first one of the inserts being substantially the same volume as a second one of the inserts, and each insert being alternately removably insertable in the slot, the second insert being a shroudless CD drive insert selectively insertable in the slot for operably driving a CD; and
    the first insert being a floppy drive insert, the slot providing an opening for inserting the first insert and a floppy disc into the housing, and the slot providing an opening for inserting the second insert into the housing, and the integrally formed slit permitting the second insert to carry the CD into the housing.

9. The system as defined in claim 8, wherein the second insert and first insert are rectangular.

10. The system as defined in claim 8, wherein the slot, the second insert and the first insert have substantially the same footprint area.

11. The system as defined in claim 8, wherein the second insert has a plurality of peripheral sides.

12. The system as defined in claim 11, wherein a portion of the CD overhangs at least two of the peripheral sides so that when the second insert passes through the slot, the CD simultaneously passes through the slit.

13. The system as defined in claim 8, wherein the second insert includes four peripheral sides.

14. The system as defined in claim 13, wherein a portion of the CD overhangs at least two of the peripheral sides so that when the second insert passes through the slot, the CD simultaneously passes through the slit.

15. The system as defined in claim 8, wherein the housing includes a connector in the slot.

16. The system as defined in claim 15, wherein each of the second insert and first insert has a connector provided for mating engagement with the connector in the slot.

17. A method of driving different size computer system storage media comprising the steps of:

providing a slit in a sidewall of a housing adjacent to and integrally formed with a storage media receiving slot;

mounting a first size media on a shroudless drive;

inserting the shroudless drive in the slot so that a portion of the first size media is carried through the slit and into the housing;

driving the first media on the shroudless drive;

removing the shroudless drive from the slot so that the portion of the first media is carried through the slit and out of the housing;

inserting an alternate drive in the slot;

inserting a second size media within the alternate drive, the second size media being of a lesser size than the first size media; and driving the second size media in the alternate drive.

* * * * *